Jan. 11, 1949.  R. L. EWALD ET AL  2,458,506
HALF FRUIT PEELER WITH COOPERATING RETAINER MEANS
Filed July 31, 1943  7 Sheets-Sheet 1

INVENTORS.
Raymond L. Ewald
Henry A. Skog
By: Loftus, Moore, Olson & Trexler
attys.

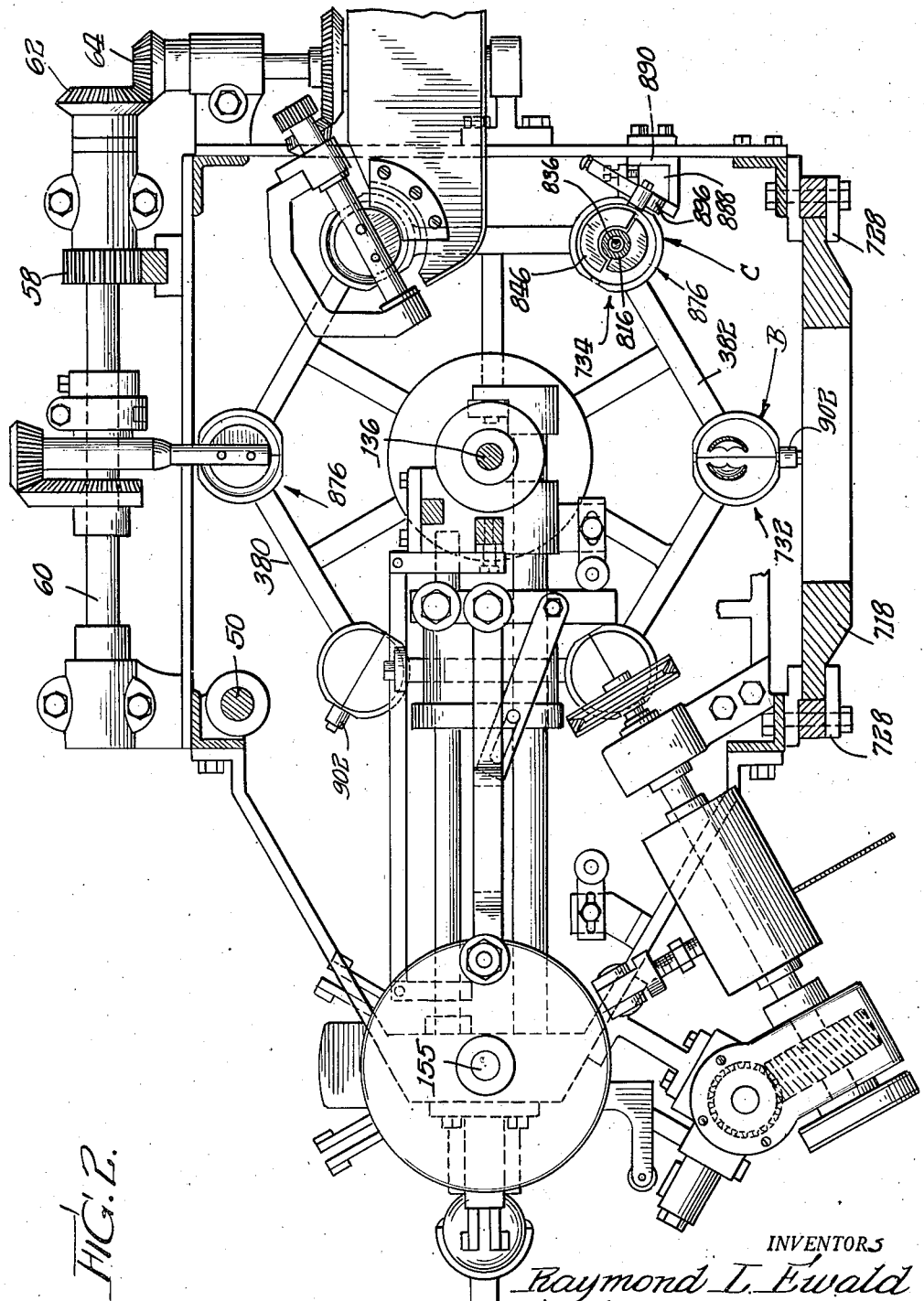

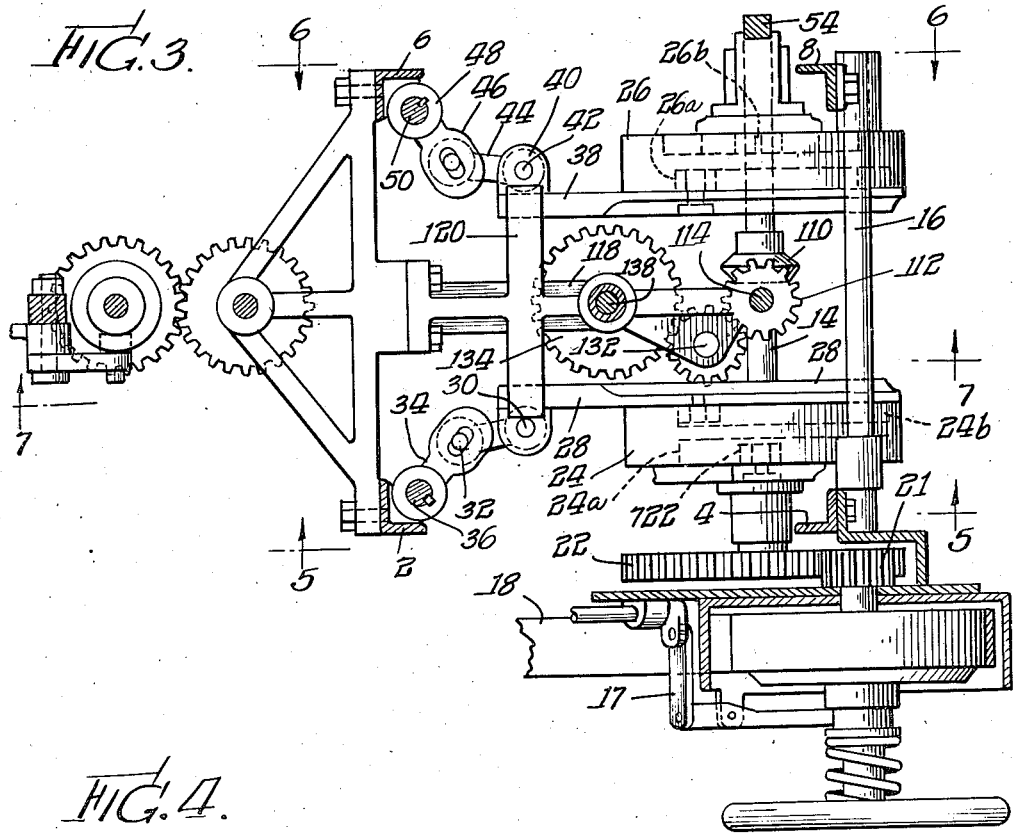
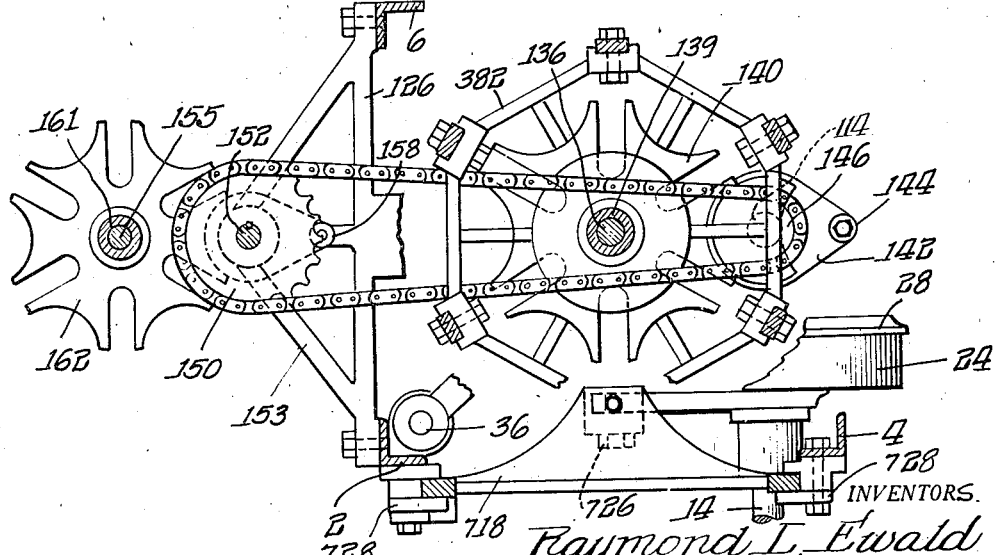

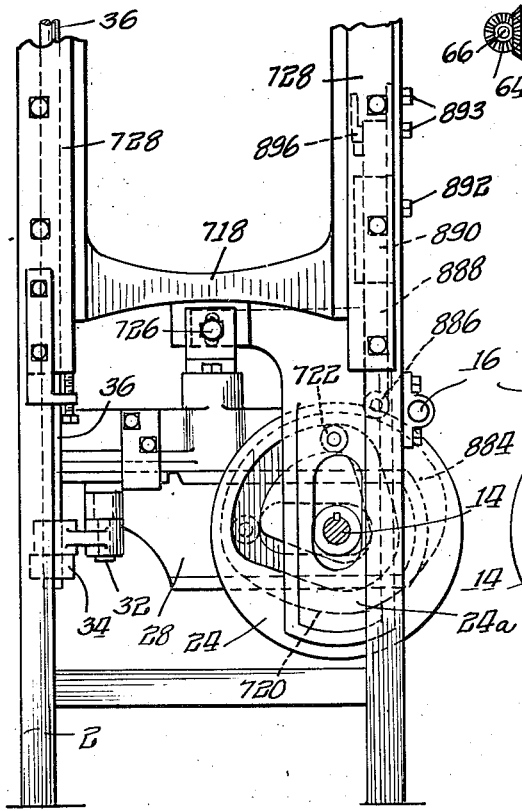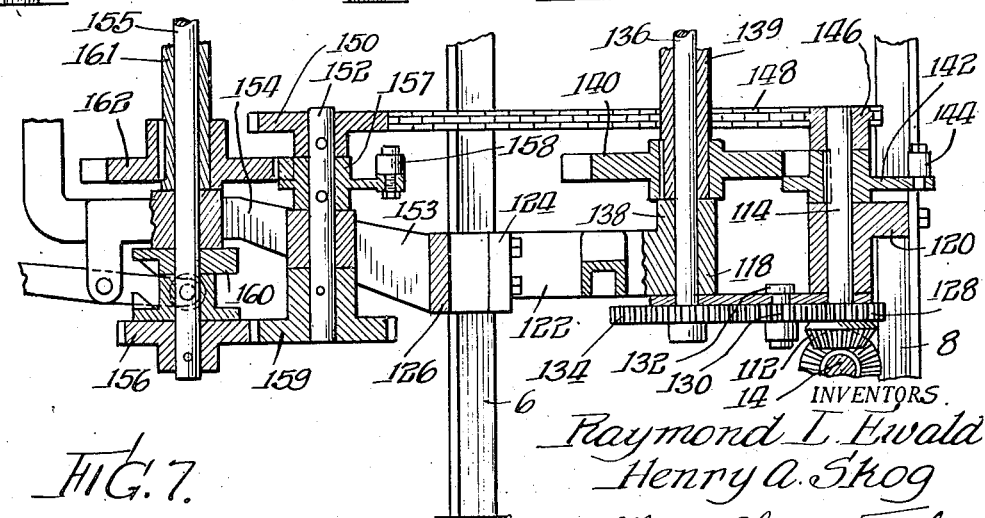

Jan. 11, 1949.  R. L. EWALD ET AL  2,458,506
HALF FRUIT PEELER WITH COOPERATING RETAINER MEANS
Filed July 31, 1943  7 Sheets-Sheet 5

INVENTORS.
Raymond L. Ewald
Henry A. Skog
By: Loftus, Moore, Olson & Trexler
Attys.

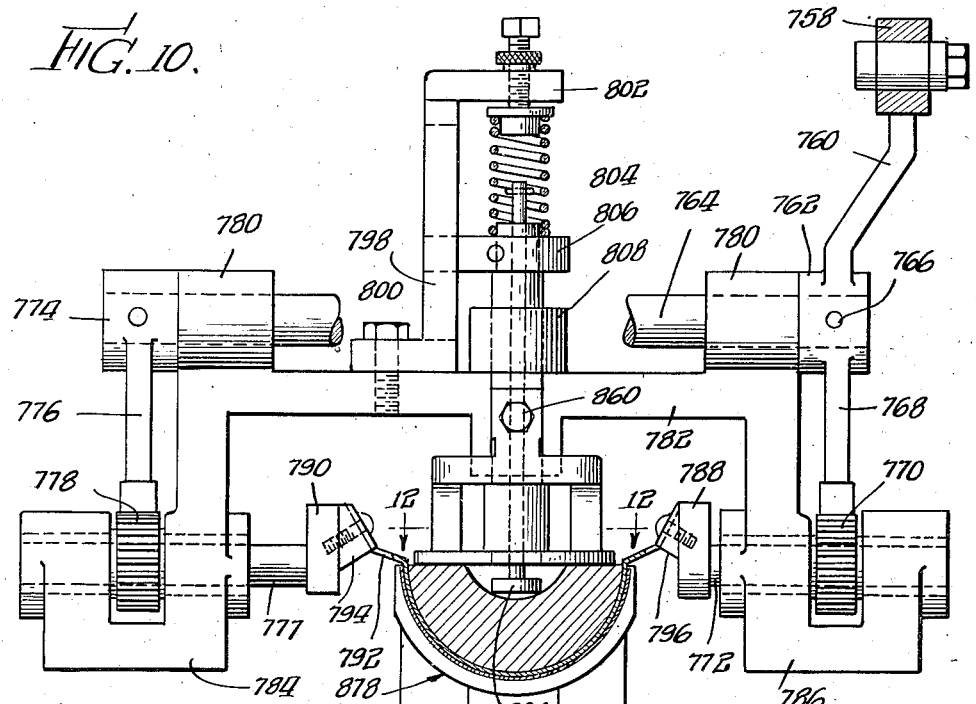

INVENTORS.
Raymond L. Ewald
Henry A. Skog
By: Loftus, Moore, Olson & Trexler
attys Patented Jan. 11, 1949

2,458,506

UNITED STATES PATENT OFFICE 2,458,506

HALF FRUIT PEELER WITH COOPERATING RETAINER MEANS

Raymond L. Ewald and Henry A. Skog, Olympia, Wash., assignors to Special Equipment Company, Portland, Oreg., a corporation of Oregon Original application October 31, 1940, Serial No. 363,596. Divided and this application July 31, 1943, Serial No. 496,884

20 Claims. (Cl. 146—43)

This invention relates to apparatus for processing fruit, and more particularly an apparatus for peeling peaches and other fruit, and particularly clingstone peaches.

The present application is a division of our pending application Serial No. 363,596, filed October 31, 1940, entitled "Fruit treating machine" patented April 23, 1946, Patent No. 2,398,780. The claims of the present divisional application relate to the peeling mechanism.

Among the objects of the present invention is to provide means for holding a pitted half peach in a cup-shaped holder and for peeling the half peach so held in a manner so that the peach will be held from turning in the cup during the peeling operation, and so that the cut face of the peach will be adequately supported and so that the peeling knife, as it emerges from the peach, will not tend to tear or chip off the peripheral portion of the half peach at the cut face thereof.

Further objects of the invention are to provide an improved peeling pad or means for contacting and holding the cut face of the half fruit during the peeling operation whereby the half fruit will be pressed inwardly into the cup-like holder during the operation of the peeling means so as to facilitate the peeling operation; to provide an improved peeling pad or fruit holder adapted to contact the cut face of the half fruit and which is constructed to eliminate the necessity of locking the peeling pad or holder in fruit contacting position relative to the cut face of the half fruit during the peeling operation; to provide an improved peeling pad or holder adapted not only yieldably to hold the half fruit in the cup during peeling, but which also includes a rigid portion adapted to cooperate with the peeling knife in a manner such that the rigid portion supports the circumferential cut surface on the half fruit where the peeling knife emerges so as to prevent breaking of the peripheral portion of the fruit at the cut face during the outward movement of the knife therethrough; to provide mechanism operable during the peeling operation wherein one of the movable sections of the holding cup or half fruit holder is adapted to be shifted whereby the knife in its movement positively shifts the half fruit during a portion of the peeling operation so as to cause a more accurate peeling operation, and wherein there is included resilient holding means adapted resiliently and yieldingly, but not rigidly, to contact and to hold the cut face of the half fruit while supported in the cup during the peeling operation, in combination with a rigidly mounted, auxiliarly or cooperative holding member adapted to shift with the peeling knife to be brought into contact with the cut face of the half fruit at the periphery or circumference of the half fruit adjacent the zone from which the peeling knife emerges at the completion of the peeling operation, whereby to prevent breaking of the edge of the fruit at the cut face during peeling, such construction likewise permitting the half fruit to shift in and relatively to the cup walls whereby to maintain the half fruit alternately against opposed walls of the fruit cup during passage of the peeling knife arcuately through the flesh of the half fruit; to provide means independent of the movement of the peeling knife for moving the shiftable member of the cup to so-called closed or eccentric position; to provide means for shifting the cup sections relatively to closed or eccentric position before the peeling pad contacts the cut face of the half fruit; to provide a relatively strong closing action of the shiftable cup section; to provide a more positive action for the closing movement of the cup section to engage the peach half between the walls of the cup; to provide these and other objects of invention, as will be apparent from a perusal of the following specification, when taken in connection with the accompanying drawings, wherein:

Figure 2 is a section taken on the line 2—2 of Figure 1.

Figure 3 is a section taken on the line 3—3 of Figure 1.

Figure 4 is a section taken on the line 4—4 of Figure 1.

Figure 5 is a section taken on the line 5—5 of Figure 3.

Figure 6 is a section taken on the line 6—6 of Figure 3.

Figure 7 is a section taken on the line 7—7 of Figure 3.

Figure 10 is a sectional view taken on line 10—10 of Figure 14 showing the peeling mechanism.

Figure 11 is a similar view showing the raised position of the peeling mechanism, and showing the surface of the fruit pad 846 as lying substantially on the axis of turning of the peeling knife 792.

Figure 12 is a section taken on the line 12—12 of Figure 10.

Figure 13 is a perspective view of the peeling pad.

Figure 1:
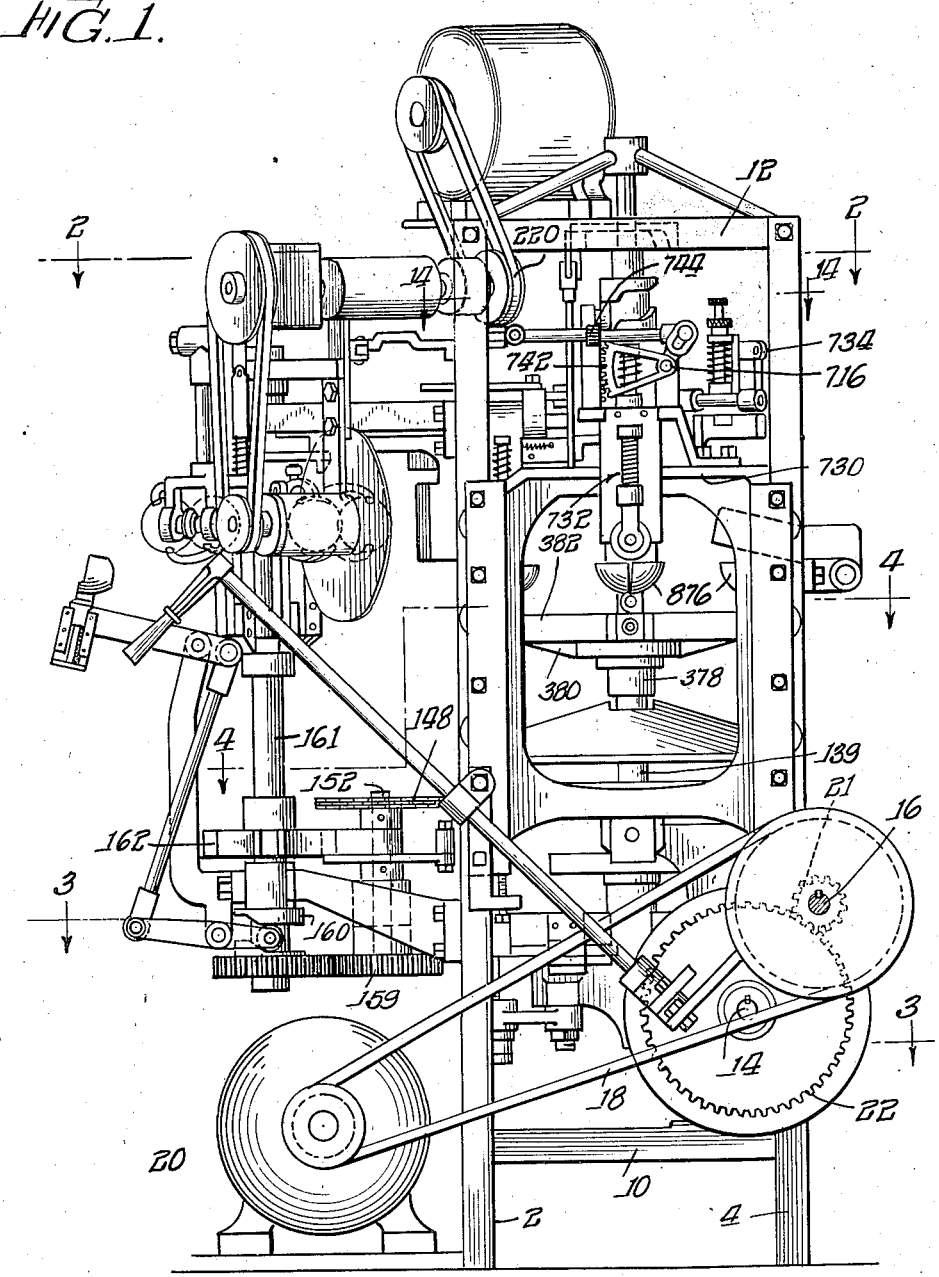
Figure 1 is a side view in perspective of one form of the invention.

The invention of the present application, while illustrated as adaptable to the construction of the parent application, is likewise capable of many different forms and adaptations for various types of machines, provided the same embody the principles of the invention claimed.

For purposes of illustration the invention is set forth in detail in connection with the type of machine illustrated in the drawings.

The embodiment illustrated comprises an automatic machine, power-driven, consisting in general of an upright main frame and an extension frame. The main turret carries fruit-holding means, specifically in the form of substantial cup-like members, each adapted to hold a half peach or half fruit. This main turret, as will be hereinafter set forth, is given an intermittent movement by well known Geneva mechanism so that the cup-like members successively are brought to a sequence of stations spaced about the main upright frame. While the various steps of processing the fruit which these stations represent form no part of the present invention, the invention being confined to the peeling station, it is thought best to refer to them briefly for full understanding of the mechanism involved. These stations comprise, first, a half fruit receiving station whereby and whereat severed sections of peaches, preferably half sections, simultaneously are disposed in pairs in adjacent cups in the manner hereinafter recited, and thereafter the turret carrying the cups is given a step movement to convey each cup in succession with its contained half fruit, specifically half peaches, to a pitting station, whereby the pit is severed therefrom. Subsequently the cup carrying the pitted half fruit is conveyed to a peeling station wherein the peeling is severed from the peach, leaving the skin of the peach underlying the half peach, and loose in the cup; next, each successive cup with the pitted and peeled half peach therein is moved to a station at which the processed half peach is discharged from the machine, leaving the loose peeling in the cup; next, each successive cup with the peeling therein is moved to a scavenging station and there the peeling is removed from the cup so that the latter is ready when subsequently again moved in cyclic fashion to the first half peach receiving station whereat each receives another half peach from the distributing mechanism.

In connection with the inventive features of the present invention, and especially in connection with the means for peeling each half fruit, there is provided new peeling pad or fruit holding mechanism adapted to engage the severed face of each half fruit and to hold the same from tilting movement in the cup or other peeling mechanism during a portion of the peeling operation. This device is also constructed and arranged to provide means for reinforcing the peripheral edge of the half fruit at which the peeling knife moves outwardly through the flesh of the fruit whereby to eliminate any tendency for the marginal portion of the flesh of the fruit to break off or to be cut or severed in a jagged manner during the peeling operation; and in addition this mechanism is arranged so that a portion of the holding means pressure pad cooperates with the edge of the moving peeling knife whereby to assist in the cutting movement. This construction, then, has permitted the elimination of any necessity of locking the peeling pad in a downward position and thereby enabling the faster movement of this mechanism.

In connection with the peeling operation, a novel arrangement for controlling the movable section of the cup during the peeling operation is provided whereby the peach is more easily pushed laterally in the cup during the peeling operation and in synchronized relation to and with the movement of the peeling knife.

The invention of the present construction preferably takes the form of an unright, substantially square, main frame comprising four corner posts of angle iron construction, 2, 4, 6 and 8, see Figures 1, 3 and 4, suitably braced at top and bottom by cross bars 10 and 12. In addition, other hereinafter described cross bars serve as rigid supports for these upright members. In a general way, extending laterally from this rectangular frame, a supplementary frame projects, which latter frame is adapted to be bolted to the main frame as shown in Figures 1 to 4. This supplementary frame is utilized to support the mechanism which initially receives the frame, the mechanism which severs the peeling at the stem cavity of the fruit, the mechanism which severs the fruit into halves and which transports the severed halves to the pitting, peeling, fruit discharging, and peel scavenging mechanism.

The main upright frame hereinbefore described is provided on a relatively low level thereof with horizontally disposed shafts 14 and 16, the latter being power-driven through a clutch mechanism shown in Figure 3 at 17, by means of a belt 18 adapted in turn to be driven by any suitable motor 20. The clutch mechanism is of any desirable construction capable of connecting and disconnecting the power source to the main operating shaft of the machine. Such a clutch is shown in certain of the co-pending applications of Mark Ewald.

As shown in Figure 3, the shaft 16 carries a gear 21 driving another gear 22 on the horizontal shaft 14. Shaft 14 carries two main cams 24 and 26, fixed on opposite ends thereof. Each of these cams is double faced, so as to provide cam operating means on each side thereof. Cam face 24a comprises a cam track in which operates a hereinafter described roller mounted on a vertically reciprocable slide for raising and lowering the main vertical slide 720 hereinafter described. The cam face 24b forms a roller race in which a roller on a horizontally reciprocable slide 28 shifts in a horizontal direction transversely to the shaft 14. This slide 28 carries on its outer end a bearing pivot 30 linked to a bearing pivot 32 on an arm 34 fixed on a vertical shaft 36. This shaft has fixed bearings in the housing frame 2 of the main upright frame of the machine. Vertical shaft 36 is oscillated by the slide 38 for operating the peeling mechanism, forming the subject matter of this application, and which will hereinafter be described.

The cam face 26 of shaft 14 has a cam face 26a forming a cam race which operates a roller connected to and operating horizontally reciprocable slide 38, all as shown in Figure 3. This slide 38 is also provided on its outer end with a bearing 40 having a vertical pin 42, to the lower end of which is pivoted a link 44. This latter link 44 carries at its outer end an arm 46, the outer bearing 48 of which is pinned to a vertically oscillatable shaft 50. Shaft 50 is mounted in the corner post 6 of the frame opposite the vertical shaft 36. This shaft 50 has affixed to its upper end an arm hereinafter referred to, which in turn pivotally connects at its outer end to a relatively long rod running diagonally across to a universal connection which is in turn connected to a mechanism that operates a sector gear reciprocable about a horizontal axis for operating the mechanism which actuates the pitting knives.

Cam race 26b operates a vertically reciprocable slide shown in Figure 6, the upper end of which is provided with a rod 54 having a rack toothed portion 56 operating a pinion 58 on a horizontal shaft 60. This horizontal shaft 60 has on one end a bevel gear 62 which in turn operates bevel gear 64 on shaft 66 having bearings on the outside of the vertical frame member and on the same level as the main fruit cup turret, hereinafter described. This turret is above that lower level of the machine at which the shafts 14 and 16 are located. Shaft 66 operates the mechanism for positioning the auxiliary fruit holding means, specifically the pad, over the fruit cup for holding the half fruit from tilting during peeling, and also for oscillating the fruit discharging means and ejecting the processed half fruit from the machine. These mechanisms will be hereinafter mentioned.

By reference to Figures 3 and 7, a second level of the main rectangular frame of the machine, bounded by the uprights 2 to 8 inclusive, provides the location for the Geneva gears for driving the main or half-fruit-holding turret, and also the whole-fruit-holding turret, including the driving means therebetween whereby the main or half-fruit-holding turret is driven at twice the speed of the whole-fruit-holding turret. To effect this function, the shaft 14 carries between its ends a bevel gear 110, shown in Figure 3, meshing with a bevel gear 112 on a vertical shaft 14 mounted in the bearing 116 carried by a cross frame 118. This cross frame is supported at one end by a suitable vertical brace connected to a cross bar 120, see Figure 7, in turn carried by the vertical upright frame members 4 and 8. The opposite end 122 of cross frame 118 is bolted to an end support by a projection 124 forming a horizontal cross bar 126 carried by the opposite vertical uprights 2 and 6 of the main frame at about the level of the cross frame 118. This cross bar 126 is preferably an integral part of the substantially triangularly shaped supplemental frame carrying the whole-fruit-holding turret.

As shown in Figure 7, shaft 114 carries a bevel gear 112 and also carries above it the gear 128, which latter meshes with a second gear 130 on a bearing 132 on the cross frame 118. Gear 130 meshes with the larger gear 134 horizontally fixed on vertical shaft 136, having a bearing in cross frame 118. This vertical shaft 136 is the turret shaft and it is surrounded by a bearing 138 above which bearing is a long sleeve 139. At the base of this sleeve 139 is fixed a Geneva gear 140 having slots therein cooperating with the Geneva member 142 on shaft 114.

As shown in Figure 4, this latter Geneva member 142 has a circular periphery on which is mounted roller 144 for cooperation with the radial slots of the gear 140 aforesaid, for integrally rotating sleeve 139 and for holding the sleeve stationary between partial turns. The upright shaft 14 above the Geneva member carries a sprocket gear 146, see Figure 7, driving a chain 148 running horizontally across the frame of the machine to a larger sprocket 150 fixed to a vertical shaft 152. This latter shaft is mounted upon a substantially triangular frame 153, see Figure 4, carried by and integral with the cross bar 126. Frame 153 carries a bearing for the shaft 152 and also has a heavy extension bearing 154, see Figure 7, for the whole-fruit-holding turret shaft 155, see Figure 7. Both of these shafts are vertical and parallel to each other. The whole-fruit-holder turret shaft 155 extends vertically upwardly toward the top of the frame. The shaft 152 has pinned thereto, just above the bearing 153, a part 157 of a Geneva, see Figure 4, which part carries the roller 158.

In addition, the shaft 152 has pinned below the support 154 a gear wheel 159, see Figure 7, which meshes with another gear 156 pinned to the bottom of the shaft 155. Just above the gear 156 a cam 160 is pinned to the shaft 155 and above the bearing 154 this shaft 155 carries a relatively long sleeve 161 to which is keyed the cooperative part 162 of the Geneva whereby through the intermediary of this Geneva 162 the sleeve 161 is intermittently rotated. This sleeve 161 carries the whole-fruit-holding turret.

*Whole fruit feed station*

Means is provided whereby an operator may feed whole peaches one at a time to the whole-fruit holding mechanism carried by the whole-fruit turret, and such mechanism comprises automatically shiftable means preferably including a concave receiver, into which a whole peach is placed by the operator, so that the stem axis and suture of the half fruit is precisely and definitely located with respect to this receiver, whereby, upon the shiftable operation of this feeding mechanism or receiver, the whole peach is automatically conveyed to whole peach gripping means preferably in the form of spaced fingers or jaws which are adapted automatically to grip the whole fruit adjacent and on substantially opposite sides of the suture plane of the whole fruit, and thereafter firmly to hold the whole fruit in the precise position in which it was placed in the first mentioned whole-fruit receiving means. Thereafter this whole-fruit gripping means is turned by the turret mechanism carrying it to a plurality of stations provided with mechanism for operating upon the peach while thus precisely held.

Direct positioning of the whole peach in the machine and the maintenance of control of a certain alignment with respect to the suture and stem cavity is very important for efficient results obtained from successive processing operations on the peach while it is fed through the machine. It is undesirable to provide feeding mechanism which gives the operator any particular leeway in properly placing the peach in the feeding jaws of the whole fruit turret, and therefore the hereinbefore described means is provided for eliminating all chance and guesswork by the provision of means whereby the operator merely places the stem cavity of the whole peach over a locating means, and in the construction of the whole-fruit receiver with concaved walls, whereby the rounded body of the peach automatically aligns its suture, so that subsequent operations may be exactly determined.

Inasmuch as the mechanical details of this whole fruit feed station form no part of the present invention, no further description is deemed necessary. The details of this mechanism are set forth and claimed in a co-pending divisional application now on file. It is sufficient to state that the mechanism of the machine which is not specifically described preferably includes means for peeling the stem cavity of the held whole fruit, thereafter sawing or severing the peach in halves, holding the peach, and transferring it to mechanism which deposits each half peach in a half-fruit cup of the main turret. The details of construction of the various mechanism for accomplishing this are described and claimed on other divisional applications filed.

Main fruit-holding turret

Means is provided for holding the divided or halved peach or fruit halves or sections in a manner so that such sections supported with their cut faces exposed, may be subjected to one or more operations. This mechanism is constructed so that the halves peaches are disposed and held in the half fruit cups with the pit axes substantially coincident with the radius line of the main fruit-holding turret so that said radius line passes through the substantial central portion of the half fruit holder, whereby the axis of movement not only of the pitting means, but also of the peeling means will lie approximately parallel to the longer axis of the pit, whereby the pitting, peeling and discharge of the half fruit from the half peach holding means is facilitated.

In the present instance it will be noted that the sleeve 139 is disposed to turn inwardly on or about the main vertical shaft 136 and extends parallel above the Geneva disc 140. This disc is affixed to the lower end of the sleeve 139. The upper end of the sleeve 139 carries a boss 378, see Figure 1, having an upper disc 380 to which the bottom-most side of the fruit-holding turret 382 is adjustably bolted, the adjustment serving to provide angular adjustment of the fruit-holding turret relative to its turning sleeve, whereby to provide an adjustment to assure that the half-fruit receiving and spreading mechanism or wings forming the subject matter of other divisional applications and of the parent case herein referred to, are in properly close together position at the time the fruit halves come onto the wing.

As clearly shown in Figure 2, the turret 380 is provided with a spider providing a mounting for the half-fruit receiving means hereinafter specifically shown as cups, and which cups are specifically described in prior Ewald patents and certain pending Ewald applications. The Ewald Patent 2,280,813 of April 28, 1942, shows certain of the details of the cup mechanism. The Ewald Patent 2,255,049, of September 9, 1941, likewise shows and claims certain of the details of the cup mechanism. In the present construction there are six of these cups, each disposed with the center line located radially of the shaft 136.

By reference to Figure 2, there is disclosed at B the pitting station, the pitting jaws being shown fragmentary, and there is disclosed at C the peeling station at which the mechanism forming the subject matter of the present application is located, about the half-fruit-holding turret.

Peach pitting mechanism

In the present process and machine, the half peaches are pitted prior to being peeled. A distinct advantage is present in carrying out this sequence in the method of and machine for processing peaches, because in the subsequent peeling operation, hereinafter to be described, the peeling operation is more efficiently carried out by, first, removing the half pit from the half peach, whereby the peeling pad in conjunction with the action of the fruit cups is enabled to press the half fruit more firmly into contact with the inner curved walls of the fruit cups than would be the case if the rigid half pit were present. It is sufficient to state that in this particular form of pitter two curved pitting blades are utilized which sever the section from the half fruit. However, it is within the contemplation of the invention to use other types of pitting mechanisms, provided they are adaptable to the present process and the present machine. No claim is made herein to the specific form of pitting mechanism per se, except insofar as a pitting device combines with one or more of the other instrumentalities of the machine for accomplishing a definite sequence of operations upon the half fruit, and this is true either considered as a method or as an apparatus. In short, the arrangement of the pitting device or pitting step in the machine or in the sequence of operations ahead of the peeling step or peeling device, is a definite improvement in the art.

In Figure 2 of the drawing, the opposed pitting blades are shown associated with one of the cups, and, as heretofore stated, are preferably of the construction shown in the prior Ewald and Skog application Serial No. 185,332, filed January 18, 1938, entitled Fruit pitting apparatus, now issued as Patent No. 2,280,813, of April 28, 1942. These blades are arranged to cut around the undersurface of the half pit during the pitting operation to an overlapping position, at which time, when the pitter head rises, the blades are lifted to carry the severed pit away from the pitted half peach, so that, when these blades are again opened, the pit will be kicked out or ejected away from the pitted half peach. The cup in the meantime will have moved to the next station, which is the peeling station, leaving therein the pitted half peach with the pit removed therefrom.

The peeling mechanism

Referring to Figures 3, 5, 14 and 15, wherein means are shown for operating the pitting and peeling mechanisms, and also means for driving the two vertical shafts 36 and 50, as hereinbefore described, the shaft 36 is provided on its upper end with a loosely mounted collar 700. This collar has formed thereon a pair of extending arms 702 and 704. By means of a pin and slot connection 706, the arm 702 is affixed to the flexible connection 708, which, in turn, is connected to a bar 710, which has at its opposite end a smaller flexible connection 712 with a slotted arm 714 (see Figure 14). This arm 714 is pivotally supported as at 716 on a vertical reciprocating frame 718 that supports the pitting and peeling mechanism. Frame 718 is reciprocated vertically by means of the cam 24, hereinbefore described. A vertical slide 720 is provided with a roller 722 which engages a cam track 24a formed on the outer surface of disc 24. The rotation of the shaft 14 rotates the disc 24, which, in turn, has a cam track 24a thereon, which will raise and lower the vertical guide 720 by means of the roller 722, thereby causing the frame 718 to raise and lower in synchronous movement with the rotating half-fruit turret. As seen in Figure 5, the vertical slide 720 is connected to the frame 718 by means of an adjustable set screw 726. The frame 718 has vertical guideways 728 which are bolted to the main frame columns 2 and 4 of the machine. Upon the upper portion of the frame 718, there is provided a platform or ledge 730 to accommodate the pitting mechanism 732 and the peeling mechanism 734, the pitting mechanism being attached to the frame 718 by means of bolts 736 and the peeling mechanism being attached to the frame by means of bolts 738.

Figure 14:
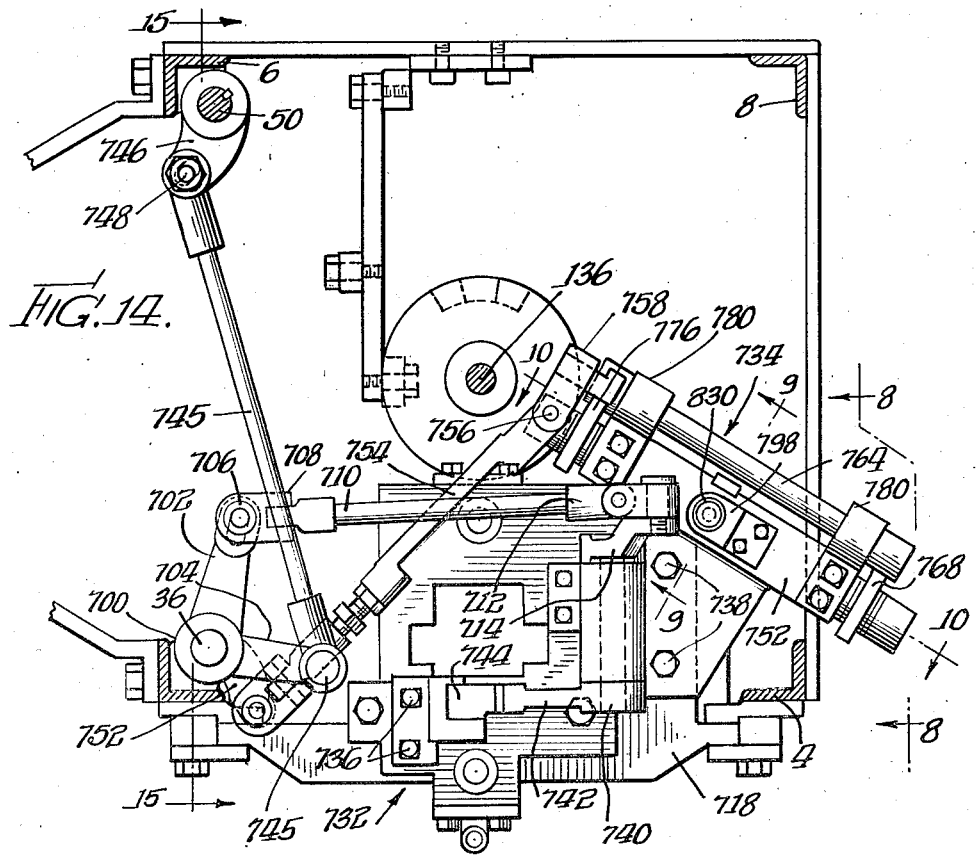
Figure 14 is a plan section taken on the line 14—14 of Figure 1.
Figure 15:
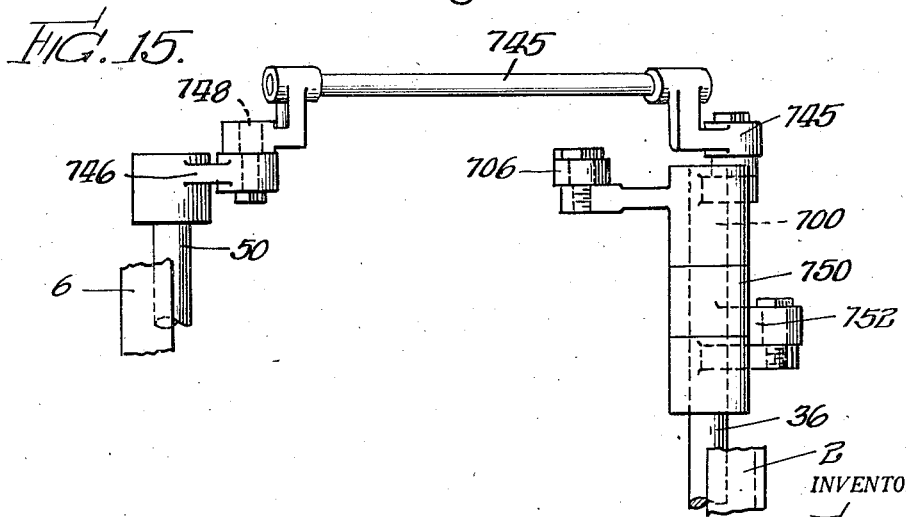
Figure 15 is a side elevation view of the driving connections for the pitting device, taken on the line 15—15 of Figure 14.

As shown in Figure 14, the driving means for the pitting device are actuated by the hereinbefore described slotted arm 714, which, in turn, is keyed to a short shaft 740. Shaft 740 has keyed on its opposite end a segment gear 742, which actuates a vertical rack bar 744, which operates the pitting mechanism.

Means for actuating the arms 704 and 702 consists of a link connection 744 connected to the outer end of the arm 704, and its opposite end is connected to a crank arm 746 by means of the pin connection 748. The crank arm 746 is keyed to the vertical shaft 50, which is actuated by the connecting links 44 and 46, et cetera, hereinbefore described. Upon actuation of the vertical shaft 50, the crank 746 imparts motion to the bar 744 to oscillate the arms 704 and 702 to actuate the drive for the pitting mechanism. Situated on the shaft 36 and directly below the collar 700 is a similar collar 750 having a crank 742, which has a flexible connection with an adjustable bar 754, and which has on its opposite end a pivoted connection 756 with a collar 753. This collar is part of an arm 760 shown in Figure 10. The arm 760 bends downwardly and is formed integral with a collar 762, which is, in turn, keyed to the shaft 764 by a pin 766. The collar 762 has also formed thereon a gear sector 768, which rotates a pinion 770, keyed on a short shaft 772. The shaft 764 which is pinned to the collar 762 has pinned on its opposite end another collar 774, which has formed thereon a gear sector 776 similar to the gear sector 768. The gear sector 776 rotates the pinion 778 in the same direction and at the same speed as the pinion 770 on the opposite side of the peeling mechanism. The shaft 764 is mounted on bearings 780 which are formed on a peeling head 782. This peeling head, likewise, at its bottom carries opposed, spaced-apart bearings 784 and 786 for the shafts 772 and 777. Each of these shafts at its inner ends is provided with a block 788 and 790, to which the opposite ends of the peeling knife 792 are affixed by means of triangular blocks 794 and 796. The peeling knife 792 is constructed in accordance with prior patents of Mark Ewald, such as Patents Nos. 2,015,666 and 1,987,611.

The peeling head 782 is provided with an upstanding bracket 798 bolted thereto as at 800, which bracket at its upper ends is provided with a laterally extending arm 802 and a guideway 804 (see Figure 11) adapted slidingly to receive an arm 806 to prevent pad 818 from turning and so that it will not contact stationary pad 846 hereinafter referred to. In addition, the head is provided with a centrally apertured boss 808 adapted to receive a vertical sleeve 810 having a central enlarged opening 812, which joins with a smaller center bore 814 of the sleeve 810. The bottommost portion of this sleeve is provided with a rigidly attached foot or pad 816, the details of which are shown in perspective in Figure 13. This pad 816 is provided with a portion 818 of larger diameter and a portion 820 of smaller diameter, there being two shoulders 822 and 824 therebetween. The pad or fruit holder 816 is large enough in area so that it contacts the cut face of the half fruit all around the pit cavity.

The top of the sleeve 810 extends outwardly through an opening in the arm 806, and a spring 826 is confined between the arm 806 and a cylindrical block 828 at its top abuts a screw 830 thereat through the lateral arm 802 of the bracket 798 on the vertically shiftable peeling head. This spring 826 creates a downward urge which causes the half peach to be held firmly in the bottom of the cup but not so firmly that the peeling knife cannot shift or change the position of the half peach as the knife cuts therethrough, as hereinafter explained. A lock nut 832 holds the nut in adjusted position to regulate tension of the spring 826, which spring, in turn, is adapted to maintain the peeling pad 818 resiliently in downwardly projecting position relative to the peeling head 782. In addition, there is provided a knock-out pad comprising a preferably circular smaller pad 834 mounted on the lower end of a rod 836 having a spring abutment member 838 pinned thereto. The upper end of this rod passes through a bore 814 of the upper end of the sleeve 810, and is provided with a cross pin acting as a stop.

In addition, a spring 842 is seated within the large bore 812 (see Figure 9) of the sleeve 810 surrounding this stem, and is confined therein between the inner wall of the upper surface of the bore and the stop collar 838, by which means the spring 842, which is weaker than the spring 826, normally maintains the knock-out pad in a position lower than the surface of the pad member 818, whereby, as the peeling head descends, the knock-out pad will first contact the pit zone of the peach, and, if the pit be present, the pad will be pushed upwardly by such contact until it seats in a countersunk recess 844 in the bottom face of the circular pad 818. If the pit has been properly removed the knock-out pad will be in the position shown in Figure 10 of the drawings. Thereafter, if the half peach in the cup be one of the relatively larger sizes, the main resilient pad 818 and in extreme instances also the knock-out pad, will be forced upwardly against the tension of the stronger spring 826, whereby adjustably to accommodate this larger sized half fruit. At the same time the pad 816 pressing downwardly on the central portion of the half fruit and being held from turning by an arm 806 in the vertical guideway 804 will maintain the half fruit from turning. The knockout pad prevents the main pad from sticking to the face of the half peach. The pad 816 contacts the cut face of the half fruit before the peeling head is at its lowest point and before the peeling knife starts to cut. Therefore the pad 816 contacts the cut face of the half fruit before the knife does. This pad 816 does not hold the cut face of the half fruit from tilting in the cup. Since the half peach is semi-spherical, the cut face can tilt and yet contact can be made, and still the spring 826 of the pad 816 will be sufficiently strong to maintain contact between the undersurface of the half fruit which is being peeled and the inner walls of the cup.

Figure 9:
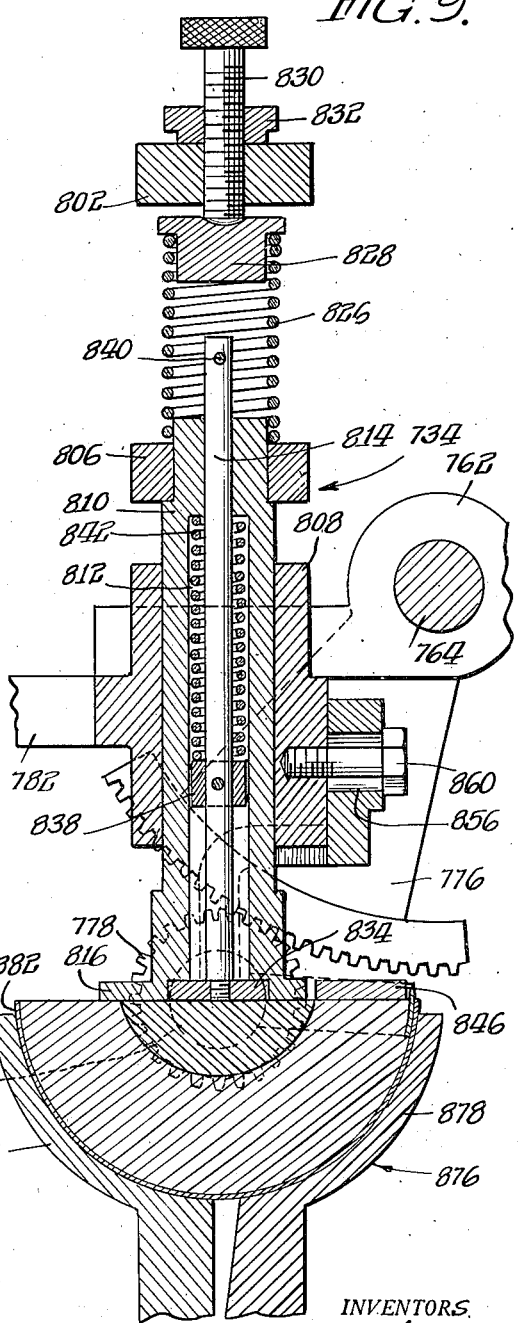
Figure 9 is a section taken on the line 9—9 of Figure 14.

Cooperating with this resiliently shiftable pad 818 is a pad 846, which is shown in Figure 13, and is likewise semicircular in shape. It has a centrally disposed semicircular cut-out 848 which corresponds to and matches the semi-circular portion 820 of the pad 816 so as to nest therewith. In addition, this pad has two upstanding posts 850 and 852, which are joined by circular extension 854 having an upstanding lug suitably apertured as at 856, whereby this pad is bolted as at 860 to a depending bracket portion 862 of the peeling head 782. A slotted portion of the bracket 862 permits adjustment of this stationary pad portion relative to the peeling head 782. It will thus be seen that this pad portion 846 is rigidly carried by and reciprocates with the main peeling head 782, which carries the oscillatable peeling knife 792, so that, when the peeling head descends to bring the knife into proper position relative to the cut face of the half fruit, as shown in Figures 9 and 10 and 11, this pad 846 will be brought downwardly into contact with that portion of the cut face of the half fruit, from which the knife blade 792 emerges during the peeling stroke or cut, whereby two functions are accomplished—first, the half fruit will be held from upward tilting movement at this point, due to the inward and downward arcuate thrust of the cutting knife as it enters the half fruit; and, secondly, the outer circular edge of the pad 846 is arranged so that it contacts the cut face of the half fruit approximately at the peel zone of the half fruit, whereby this circular edge of the pad 846 cooperates with the cutting edge of the peeling knife to form, with the peeling knife, a cooperative shearing edge. Also this stationary edge of the pad 846 provides means for preventing the edge of the half fruit at the cut face from breaking off as the peeling knife emerges from the cut face of the half fruit upon the completion of the peeling cut in this direction.

By reference to Figure 11 it will be seen that the rigidly mounted peeling pad 846 is mounted substantially on the axis of turning of the peeling knife and that the auxiliary pad 818 which is centrally located and smaller than the rigid pad 846, when normally projected in advance of the rigid pad 846, will not interfere with the arcuate movement of the peeling knife as the head descends as the peeling knife begins its downward movement.

By thus providing this stationary peeling pad 846 in combination with a resiliently shiftable peeling pad 816, and by arranging the stationary pad 846 at the knife emerging face of the cut fruit while providing the resiliently mounted peeling pad 816 at the entrance face of the half fruit with respect to the peeling knife, the necessity of positively locking the peeling pad in downward position on the cut face of the half fruit for a whole or even a part of the peeling cut, is eliminated; while at the same time during the initial portion of the downward movement of the peeling cut through the half fruit, the peeling pad 816 which is provided with adjustable resilient action in upward and downward direction, holds the half fruit firmly against the bottom wall of the peeling cup while at the same time permitting the half fruit to be laterally shifted by the peeling knife as hereinafter disclosed. In this pad arrangement, the pad 816 is maintained a standard size for all sizes of fruit, whereas the pad 846 is replaceable with pads of smaller or larger sizes, so that the arcuate edge 846 of this pad will always lie relatively close to the path of movement of the peeling knife, depending upon the size of the half fruit being operated upon, whereby this edge of the stationary pad acts as a sort of shearing knife to cooperate with the edge of the peeling blade.

Figure 8:
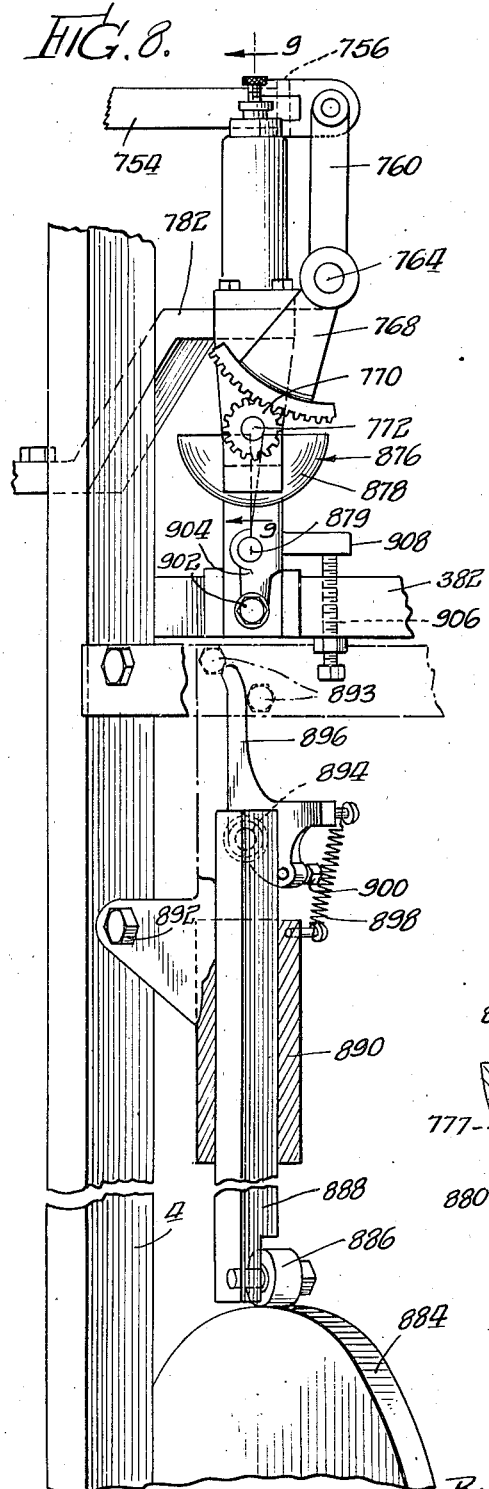
Figure 8 is a section taken on the line 8—8 on Figure 14.

The half fruit receiving cups are constructed in the same manner as in the prior patent of Raymond L. Ewald and Henry A. Skog, No. 2,280,813, of April 28, 1942. However, the means for moving the enlarged half section into eccentric relation to the stationary half section has been changed somewhat, and is shown in Figure 8.

In this connection it will be noted that the turret 580 has mounted thereon six half peach receiving cups, which are of the general conformation shown in Figures 9 and 10. One of the quarter sections 880 of each of these cups is rigidly bolted by means of a bolt 381 to the spider of the turret 382. The other cup section 878 is hingedly mounted to the stationary section as by means of the pin 879, whereby these two complemental quarter cup sections will make a substantial half sectional cup. These relatively swingable cup sections have a so-called closed position, wherein the two sections are eccentric one to the other, and this eccentric position is accomplished by moving the swingable fruit holder toward the stationary fruit holder, whereby to press the curved wall 882 of the half fruit against the inner wall of the adjacent stationary section 880, so that on the down stroke of the cutting blade 792, the firm contact of the periphery of the half fruit against the wall of the cup section 880 is assured, and whereby correct peeling is likewise assured; and subsequently, in timed relation with the arcuate movement of the peeling knife 792 and about the time that is necessary to reach somewhere between one third of its way downward and the bottommost part of its stroke, the actuating mechanism for the shiftable half cup is released, so that the shiftable half cup 878 is free to swing to an open position, preferably by the action of gravity. In this position the cup sections 880 and 878 will be truly concentric. At this time, movement of the peeling knife 792 will push over the half fruit against the inner adjacent wall of the swingable cup section 878 now in its truly concentric position and simultaneously, as the knife continues to move, it will start its upward, arcuate cut slightly under the peel, whereby continuously to form the peeling cut. This whole portion of the cut will be the emerging peeling cut. The mechanism for carrying out this operation, as shown more clearly in Figures 8 and 9, consists of a cam 884 which is keyed to the shaft 14 and a cam roller 886 which is fixed to a vertical slide bar 888, and engages the cam 886, as shown. The slide bar 888 is guided in a guideway 890, which is bolted to the frame 4 as at 892 and 893, and this bar 890 has pivoted on its upper end as at 894 a cam finger 896 which is held in the position shown in Figure 8 by a spring 898 and a stop screw 900 which, as shown in Figure 2, engages the side of the vertically reciprocable bar 888 and is adjustable to vary the position of the cam finger 896 relative to the bar and thus adjustably determine the time of the closing of the cup segment 878. Upon raising the bar 888, the cam finger 896 contacts a roller 902 on a depending arm 904 pivoted on the shaft 879 and having its upper portion formed integral with the righthand movable section of the fruit cup 878.

Due to the tension of the spring 898, the cam finger 896 exerts a pressure on the roller 902 which, in turn, moves the righthand portion 878 of the fruit cup toward the lefthand portion 880, thereby clamping or exerting a yielding pressure on the side of the fruit to hold it substantially rigid in the fruit cup while the peeling is taking place. In addition, an adjustable stop screw 906 contacts an extension 908 formed on the support arm 904, and prevents the cup section 876 from being swung out of concentric alignment with the lefthand cup section 880. This type of construction for shifting the swingable cup section 878 toward the stationary cup section 880 is more positive, also independent of the movement of the peeling knife and permits the relatively closing movement of the cup section 878 before the peeling pad comes in contact with the face of the fruit, which is not possible in the prior construction because the cup thereof does not start to move until the peeling knife starts to turn. A more positive action is required in the peach machine due to the nature of the peel surface of the half peach, as distinguished from the more smooth surface of a pear. Therefore a stronger closing action of the cup 878 is required, and this is accomplished by the mechanism shown in Figure 8.

In connection with the drawings, Figure 10 shows a half peach of a size completely to fill the cup and in this Figure 10 it is assumed that the peach is substantially one half of a perfect sphere, because the cut face is in contact evenly with the pad 846. The pad 818 in this figure has been pushed up so that it lies even with the pad 846. The knockout pad is shown as resting in the pit cavity. If the peeling knife in this Figure 10 were in the same position as it occupies in Figure 11, we would then have the pads and the peeling knife in the position relative to the cut face of the half peach as the knife would occupy just before it starts its cutting stroke.

In explanation of the movements of the knife, the peeling head, the various pads, and the relatively shiftable cup sections, it will thus be seen that as the peeling head lowers, the knockout pad 834 contacts the pit cavity in the cut face of the half fruit. It is to be borne in mind that the relatively weaker spring which operates this knockout pad is selected so that it will exert sufficient pressure between the pad and the pit cavity so that when the peeling head rises, this pressure exerted by the knockout pad will break the suction between the flat face of the half fruit and the larger pads 818 and 846. This is the only function of the knockout pad and its spring is selected so that it does not interfere with the actions of the two other pads. As the peeling head continues to lower, the pad 818 next comes in contact with the cut face of the half fruit. As the half peace is the same size as the cup, the pads 818 and 846 will assume the position as shown in Figure 10. If, however, the half peach is smaller than the cup, the pad 818 will be somewhere between the position shown in Figure 11 and that shown in Figure 10.

At this sequence in operations the side pushers or mechanisms shown in Figure 8 now act to close the sections of the cup, as hereinbefore explained, to the size of the half fruit contained therein. In other words, the cup sections are brought together eccentrically so as to force the wall of the half peach firmly against the stationary inner wall of the cup section 880 so that as the knife swings downwardly in making the entrance cut it will peel the half fruit concentrically with the inner wall of this stationary cup section 880. As before stated, the peeling knife now starts down into the fruit and when it gets about one third of the way down into the cup or somewhere between one third of the way down and the bottommost portion of its stroke, the side pusher mechanism illustrated in Figure 8 releases the hinged half cup section 878 and as the peeling knife continues its cutting stroke downwardly and across the bottom portion of the half cup, the knife carries or pushes the half peach laterally or sideways firmly toward the inner wall of the shiftable cup section 878 which is now shifted either by the lateral pushing or by gravity to a concentric position with respect to the stationary section 880 of the cup. At the same time as the half peach is moved thus laterally, the knife also tends to tilt the half peach in the cup until the face of the half peach where the peeling knife emerges is in contact with the undersurface of the pad 846. This operation, of course, only occurs when the peach is smaller than the cup. In instances where the peach is the same size or larger than the cup, the pad 846 has already engaged the cut surface of the half fruit and will thereby prevent any such upward tilting.

With regard to the configuration and size of the pads 818 and 846, the side of the pad 818 is made smaller on that side adjacent the pad 846 so that when a pad 846 is placed on the machine for the smallest peach in the range that has to be run, that part of the flange between the numbers 848 and 846, see Figure 13, will be of sufficient width so that there will be a minimum of fruit bruising or cutting into the cut face of the half fruit while at the same time providing sufficient strength. The opposite side of the pad 818 is made as large as permissible. That is, it must be just small enough so that when there is no peach in the cup and/or on the downward descent of the peeling head, see Figure 11, the peeling knife in turning will not strike that side of the pad 818 which overlies the knife entering zone of the cut face of the half fruit. The shoulders 822 and 824, see Figure 12, on the pad 818 are preferably the same. For standardization of parts the inner curve 848, as shown in Figure 13, of the pad 846 is the same size on all sizes of the pad 846, and the opposite side of the pad 818 is subject to variation, such as increased or decreased depending upon the size of the fruit being peeled. Hence the smaller radius of the pad 818, shown at 820 in Figure 13, fits the inner curve 848 in Figure 13 of pad 846, and the opposite side of the pad 818 clears the knife in the position shown in Figure 11 on the downward swing of the knife.

In any situation where there is a smaller half fruit in the cup, this half fruit can tilt in the cup because the peeling knife creates that tendency as it moves downwardly through the cut face of the half fruit in making the first portion of the peeling cut, and the spring tension from the spring 826 is not stiff enough to prohibit this action. In the peeling of peaches there is considerable friction between the cup and the outer fuzzy surface of the peach, and therefore the peach does not tilt from the pressure of the pad 818 due to the fact that this pad is larger on the entering side. Even if this did occur, however, no harm would be done as long as the peach was held down in the cup by the pad 818 because when the pad 846 contacts the peach it would straighten it before the peeling knife went into action. In the smaller size of the peaches the pads 834 and 818 contact the fruit first and the pad 846 may not be contacted until the peeling knife has tilted the peach to cause the contact. In any event the half peach does not start any tilting movement in and relatively to the cup sections until the side pushers release the hinged half of the cup, which is at a point when the knife is about one third to one half way down in the cup. When the hinged half of the cup is thus released the half peach may follow the release by both shifting sideways and tilting in the cup, or sufficient arcuate turning of the knife may take place so that there is a more upward pull on the peach as the knife approaches its point of emergence from the fruit.

Obviously the invention is not limited to the specific details of construction disclosed herein, but is capable of other modifications and changes without departing from the spirit and scope of the appended claims.

The invention is hereby claimed as follows:

1. In a device of the class described, in combination with a half fruit holder adapted to receive and hold a half fruit with its cut face exposed, a peeling head, means for shifting the peeling head into position adjacent the cut face of the half fruit, a peeling knife, means for arcuately moving the knife through the flesh of the half fruit to peel the same, means carried by the peeling head for contacting the cut face of the half fruit during peeling comprising complemental parts, one of said parts being rigidly carried by the peeling head and overlying that portion of the cut face of the half fruit from which the peeling knife emerges, and another part overlying a portion of the cut face of the half fruit into which the peeling knife enters, said last mentioned part being resiliently mounted with respect to the peeling head.

2. In a device of the class described, in combination with a cup-shaped holder adapted to receive a half fruit to hold the same with the cut face exposed, a peeling head shiftable into position adjacent the cut face of the half fruit, a peeling knife carried by the head and arcuately shiftable through the flesh of the half fruit to peel the same, peeling pad means mounted on said head and comprising a portion rigidly carried thereby and overlying that portion of the cut face of the half fruit from which the peeling knife emerges, and comprising a second portion overlying another portion of the half fruit, said last mentioned portion being resiliently mounted with respect to the peeling head, and a knock-out pad mounted in said last mentioned pad portion and normally extending resiliently from the face thereof, said knock-out pad being shiftable to a position such that the faces of the knock-out pad and the second mentioned pad are substantially flush when contacting the cut face of the half fruit.

3. In a device of the class described, in combination with a holder adapted to hold a half fruit with its cut face uppermost, a peeling head, means for relatively positioning the head and the cut face of the half fruit into adjacency, a peeling knife mounted on said head, means for moving the peeling knife arcuately through the flesh of the half fruit to peel the same, whereby to cause the knife to enter and emerge from the cut face of the half fruit, auxiliary fruit holding means carried by said head and comprising a portion overlying the cut face of the half fruit within the walls of the fruit holder, said portion being positioned laterally of and sufficiently close to the marginal edge of the half fruit and slightly laterally of the location at which said peeling knife emerges therefrom, said portion having a wall constructed and arranged to cooperate with the cutting edge of the knife to form a shearing edge with said knife to facilitate the peeling of the half fruit, and whereby to prevent the breaking off of the flesh of the half fruit at the cut face thereof upon the emerging of the knife from the cut face.

4. In a device of the class described, in combination with a cup-shaped holder adapted to hold a half fruit with its cut face uppermost, a peeling head, means for relatively positioning the head and the cut face of the half fruit into adjacency, a peeling knife mounted thereon, means for moving the peeling knife arcuately through the flesh of the half fruit to peel the same, whereby to cause the knife to enter and emerge from the cut face of the half fruit, auxiliary fruit holding means comprising a portion overlying the marginal edge of the half fruit adjacent the location at which said peeling knife emerges therefrom, and cooperating with the path of movement of the knife to form a shearing edge with said knife to facilitate the peeling of the half fruit, and whereby to prevent the breaking off of the flesh of the half fruit at the cut face thereof upon the emerging of the knife from the cut face.

5. In a device of the class described, in combination with a cup-shaped receiver to hold a half fruit with its cut face exposed, a peeling head, means for relatively shifting the peeling head and receiver to cause the peeling head to be placed adjacent the cut face of the half fruit and held in said receiver, a peeling knife carried by the head, means for arcuately shifting said knife through the flesh of the half fruit to peel the same, and means contacting the cut face of the half fruit and forming a shearing blade adapted shearingly to cooperate with the peeling blade as it emerges from the body of the half fruit while held in the cup-shaped receiver.

6. In a device of the class described, in combination with fruit holding means adapted to hold a half fruit with its cut face exposed, a peeling head, a peeling knife carried thereby, means for relatively shifting the fruit holder and peeling head to bring them into adjacency, means for moving the knife arcuately through the flesh of the half fruit to peel the half fruit, and auxiliary fruit holding means adapted to contact the cut face of the half fruit at the location where the peeling means emerges from the flesh of the half fruit, and forming in association with said emerging peeling means a shearing blade to assist the peeling action.

7. In a device of the class described, in combination with fruit holding means adapted to hold a half fruit with its cut face exposed, a peeling head, a peeling knife carried thereby, means for relatively shifting the fruit holder and peeling head to bring them into adjacency, means for moving the knife arcuately through the flesh of the half fruit to peel the half fruit, and an auxiliary shearing blade adapted to be positioned adjacent the path of movement of the peeling means as it emerges from the flesh of the half fruit in making the peeling cut and forming in association with the peeling means a shearing blade to assist in the peeling action.

8. In a device of the class described, in combination with fruit holding means adapted to hold a half fruit with its cut face exposed, a peeling head, a peeling knife carried thereby, means for relatively shifting the fruit holder and peeling head to bring them into adjacency, means for moving the knife arcuately through the flesh of the half fruit to peel the half fruit, said peeling means comprising an arcuate peeling blade and an arcuately shaped member adapted to be positioned adjacent the path of movement of the arcuately shaped blade at the cut face of the half fruit to form a shearing edge cooperating with the movable shearing blade to improve the peeling action as the peeling blade emerges from the cut flesh of the half fruit at the cut face thereof.

9. In combination, means providing a substantially concave fruit holder adapted to hold a half fruit by the outer curved wall of the half fruit, leaving the cut face of the half fruit exposed, a peeling head, means for producing relative movement between the peeling head and the fruit holder, whereby the peeling head and cut face of the half fruit are positioned relatively adjacent one another, a peeling knife mounted about an axis on the peeling head for arcuate movement, a first auxiliary fruit holding means rigidly mounted on the peeling head with its undersurface lying in the plane of the axis of the peeling knife and having an arcuate fruit contacting surface solely overlying and contacting that half of the cut face of the half fruit from which the peeling knife emerges in making the peeling cut, the outer periphery of said fruit contacting surface contacting and supporting that part of the cut face of the half fruit which is adjacent to and slightly spaced from the inner wall portion of the unsevered peeling of the half fruit whereby as the peeling knife emerges from the half fruit in making the peeling cut the peripheral edge of said arcuate fruit supporting portion of said contacting surface will function to create a shearing action whereby the knife will sever the peeling at the cut face of the half fruit without tearing the flesh.

10. In combination, means providing a substantially concave fruit holder adapted to hold a half fruit by the outer curved peeling wall of the half fruit, leaving the cut face of the half fruit exposed, a peeling head, means for producing relative movement between the peeling head and the fruit holder, whereby the peeling head and cut face of the half fruit are positioned relatively adjacent one another, a peeling knife mounted for arcuate movement about an axis on the peeling head for arcuate movement, a first auxiliary fruit holding means rigidly mounted on the peeling head so as to have its undersurface lying in the plane of the axis of the peeling knife and having an arcuate fruit contacting surface solely overlying and contacting that half of the cut face of the half fruit from which the peeling knife emerges in making the peeling cut, the outer periphery of said fruit contacting surface contacting and supporting that part of the cut face of the half fruit which is adjacent to and slightly spaced from the inner wall portion of the unsevered peeling of the half fruit whereby as the peeling knife emerges from the half fruit in making the peeling cut the peripheral edge of said arcuate fruit supporting portion of said contacting surface will function to create a shearing action whereby the knife will sever the peeling at the cut face of the half fruit without tearing the flesh, and a second auxiliary fruit holding means yieldably mounted upon said peeling head and adapted yieldingly to contact the cut face of the half fruit at and adjacent the central portion or pit portion thereof.

11. In combination, means providing a substantially concave fruit holder adapted to hold a half fruit by the outer curved peeling wall of the half fruit, leaving the cut face of the half fruit exposed, a peeling head, means for producing relative movement between the peeling head and the fruit holder, whereby the peeling head and cut face of the half fruit are positioned relatively adjacent one another, a peeling knife mounted for arcuate movement about an axis on the peeling head for arcuate movement, a first auxiliary fruit holding means rigidly mounted on the peeling head with its undersurface lying in the plane of the axis of the peeling knife and having an arcuate fruit contacting surface solely overlying and contacting that half of the cut face of the half fruit from which the peeling knife emerges in making the peeling cut, the outer periphery of said fruit contacting surface contacting and supporting that part of the cut face of the half fruit which is adjacent to and slightly spaced from the inner wall portion of the unsevered peeling of the half fruit whereby as the peeling knife emerges from the half fruit in making the peeling cut the peripheral edge of said arcuate fruit supporting portion of said contacting surface will function to create a shearing action whereby the knife will sever the peeling at the cut face of the half fruit without tearing the flesh, and a second auxiliary fruit holding means yieldably mounted upon said peeling head and adapted yieldingly to contact the cut face of the half fruit at and adjacent the central portion or pit portion thereof, said second mentioned auxiliary fruit holding member being of relatively smaller area than said first mentioned auxiliary fruit holding means.

12. In combination, means providing a substantially concave fruit holder adapted to hold a half fruit by the outer curved peeling wall of the half fruit, leaving the cut face of the half fruit exposed, a peeling head, means for producing relative movement between the peeling head and the fruit holder, whereby the peeling head and cut face of the half fruit are positioned relatively adjacent one another, a peeling knife mounted for arcuate movement about an axis on the peeling head for arcuate movement, a first auxiliary fruit holding means rigidly mounted on the peeling head and having an arcuate fruit contacting surface solely overlying and contacting that half of the cut face of the half fruit from which the peeling knife emerges in making the peeling cut, the outer periphery of said fruit contacting surface contacting and supporting that part of the cut face of the half fruit which is adjacent to and slightly spaced from the inner wall portion of the unsevered peeling of the half fruit whereby as the peeling knife emerges from the half fruit in making the peeling cut the peripheral edge of said arcuate fruit supporting portion of said contacting surface will function to create a shearing action whereby the knife will sever the peeling at the cut face of the half fruit without tearing the flesh, and a second auxiliary fruit holding means yieldably mounted upon said peeling head and adapted yieldingly to contact the cut face of the half fruit at and adjacent the central portion or pit portion thereof, said first mentioned auxiliary fruit holding pad having a central recess formed therein and said second mentioned auxiliary fruit holding pad being spaced from but fitting within said recess and contacting the central portion of the cut face of the half fruit.

13. In combination, means providing a substantially concave fruit holder adapted to hold a half fruit by the outer curved peeling wall of the half fruit, leaving the cut face of the half fruit exposed, a peeling head, means for producing relative movement between the peeling head and the fruit holder, whereby the peeling head and cut face of the half fruit are positioned relatively adjacent one another, a peeling knife mounted for arcuate movement about an axis on the peeling head for arcuate movement, a first auxiliary fruit holding means rigidly mounted on the peeling head and having an arcuate fruit contacting surface overlying and contacting a portion of that half of the cut face of the half fruit from which the peeling knife emerges in making the peeling cut, the outer periphery of said fruit contacting surface contacting and supporting that part of the cut face of the half fruit which is adjacent to and slightly spaced from the inner wall portion of the unsevered peeling of the half fruit whereby as the peeling knife emerges from the half fruit in making the peeling cut the peripheral edge of said arcuate fruit supporting portion of said contacting surface will function to create a shearing action whereby the knife will sever the peeling at the cut face of the half fruit without tearing the flesh, and a second auxiliary fruit holding means yieldably mounted upon said peeling head and adapted yieldingly to contact the cut face of the half fruit at and adjacent the central portion or pit portion thereof, said second mentioned auxiliary fruit holding member having a central recess, and a third auxiliary fruit contacting member projecting in advance of the fruit contacting surface of said second mentioned auxiliary pad, and yielding means for projecting said third mentioned fruit holding member normally in advance of said second mentioned fruit holding member while permitting said third mentioned fruit holding member to yieldingly move back so that its surface is flush with the surface of said second mentioned fruit holding pad.

14. In combination, means providing a substantially concave fruit holder adapted to hold a half fruit by the outer curved wall of the half fruit leaving the cut face of the half fruit exposed, a peeling head, means for producing relative movement between the peeling head and the fruit holder whereby the peeling head and the cut face of the half fruit are positioned relatively adjacent one another, a peeling knife mounted on the peeling head for arcuate movement about an axis, a first auxiliary fruit holding means rigidly mounted on the peeling head and having an arcuate fruit contacting surface overlying and contacting a portion of that half of the cut face of the half fruit from which the peeling knife emerges in making the peeling cut, the outer periphery of said fruit contacting surface contacting and supporting that part of the cut face of the half fruit which is adjacent to and slightly spaced from the inner wall portion of the unsevered peeling of the half fruit whereby as the peeling knife emerges from the half fruit in making the peeling cut the peripheral edge of said arcuate fruit supporting portion of said contacting surface will create a shearing action with the knife whereby the knife will sever the peeling at the cut face of the half fruit without tearing the flesh, a second auxiliary fruit holding means yieldingly mounted upon the peeling head and adapted yieldingly to contact the cut face of the half fruit at and adjacent the central portion or pit portion thereof, means for normally yieldingly projecting said auxiliary fruit holding means in advance of said first mentioned fruit holding means, and a third auxiliary fruit holding means yieldingly mounted with respect to said head and said first and second mentioned fruit holding means, and means for normally projecting said third mentioned fruit holding means in advance of said second mentioned fruit holding means, said third mentioned fruit holding means being adapted first to contact the cut face of the half fruit and thereafter to yield to a position substantially flush with the fruit contacting surface of the second mentioned fruit holding means.

15. In combination, means providing a fruit holder adapted to hold a half fruit by the outer curved peeling wall of the half fruit leaving the cut face of the half fruit exposed, a peeling head, means for producing relative movement between the peeling head and the fruit holder whereby the cut face of the half fruit and the holder are positioned relatively adjacent each other, a peeling knife mounted on the peeling head for arcuate movement, three auxiliary fruit holding means mounted on said peeling head, each adapted to contact a different area of the cut face of the half fruit during the peeling action, two of said fruit holding and contacting means being yieldingly projectible in advance of the other, and one of said last two mentioned yielding fruit holding means being also normally projectible in advance of the other of said last two mentioned fruit holding means.

16. In combination, means providing a fruit holder adapted to hold a half fruit by the outer curved peeling wall of the half fruit leaving the cut face of the half fruit exposed, a peeling head, means for producing relative movement between the peeling head and the fruit holder whereby the cut face of the half fruit and the holder are positioned relatively adjacent each other, a peeling knife mounted on the peeling head for arcuate movement, three auxiliary fruit holding means mounted on the peeling head each adapted to contact a distinct and separate area of the cut face of the half fruit during the peeling action, one of said auxiliary fruit holding means being rigidly mounted on the head and the two remaining fruit holding means being yieldingly mounted on the head and being projectible normally in advance of the rigidly mounted fruit holding means, and one of the two yielding fruit holding means being normally projectible in advance of the other, the fruit contacting surface of the two auxiliary yielding fruit holding means being yieldable to move rearwardly into the plane of the fruit contacting surface of the rigidly mounted fruit holding means.

17. In a device of the class described, in combination with fruit holding means adapted to hold a half fruit with the cut face of the half fruit exposed, a peeling head, means for relatively vertically shifting said peeling head and the fruit holding means whereby the peeling head and the cut face of the half fruit are positioned adjacently, a peeling knife on said head movable to cut through the flesh of the half fruit to peel the same, a first auxiliary fruit holder rigidly carried by the peeling head and immovable relatively to the head, and a second auxiliary fruit holder resiliently carried by the peeling head and shiftable with respect thereto, said rigidly mounted auxiliary fruit holder contacting the cut face of the half fruit on that side of the cut face of the half fruit at which the peeling knife emerges in making the peeling cut, and said resiliently mounted auxiliary fruit holding means contacting that half of the cut face of the half fruit adjacent the zone into which the knife enters the half fruit at the cut face in making the peeling cut.

18. In a device of the class described, in combination with a fruit holder adapted to hold a half fruit with its cut face exposed, a peeling head, a peeling knife carried thereby, means for relatively shifting said head and fruit holder into adjacency while the fruit is so held and means for swinging said peeling knife arcuately through the flesh of the half fruit while so held to peel the same, and additional fruit contacting mechanism carried by the peeling head adapted to contact the cut face of the fruit and forming a shearing blade adapted shearingly to cooperate with the peeling blade as it emerges from the half fruit.

19. In a device of the class described, in combination with fruit holding means adapted to hold a half fruit with its cut face outermost, a peeling head, means to cause relative motion between the fruit holding means and the head to cause them to be positioned relatively adjacently, a peeling knife carried by said head, means for arcuately moving the knife through the flesh of the half fruit to peel the same, auxiliary fruit holding means having a flat face, a portion of said face being disposed to overlie a portion of the cut face of the half fruit on one side of the central portion thereof and being mounted resiliently to contact the cut face of the half fruit during the peeling action, and having another flat-faced portion disposed to overlie a portion of the cut face of the half fruit on the opposite side of the central portion thereof and being mounted rigidly to contact the cut face of the half fruit during the peeling action, said first mentioned flat face being mounted normally resiliently on said head to contact the cut face of the half fruit in advance of said second mentioned flat-faced portion.

20. In a device of the class described, in combination with a support, a carrier movable thereon and carrying a plurality of fruit holding means, each comprising a stationary portion and a portion pivotally mounted with respect thereto, a peeling head, power operated peeling means on said head, said pivotally mounted fruit holding portion having an arm, power operated actuating means mounted on said support, vertically shiftable means disposed below said fruit holding means when said fruit holding means is in a predetermined peeling position with respect to said peeling head and said peeling means, said power means actuating said vertically shiftable means vertically to shift said arm to move one of said portions of said fruit holding means toward the other prior to at least a portion of the peeling movement of the peeling means.

RAYMOND L. EWALD.
HENRY A. SKOG.

REFERENCES CITED

The following references are of record in the file of this patent:

UNITED STATES PATENTS

| Number | Name | Date |
|---|---|---|
| 1,766,496 | Fonken | June 24, 1930 |
| 1,769,654 | Spencer | July 1, 1930 |
| 1,948,459 | Ewald | Feb. 20, 1934 |
| 2,242,243 | Ewald et al. | May 20, 1941 |
| 2,242,244 | Ewald | May 20, 1941 |
| 2,255,049 | Ewald | Sept. 9, 1941 |